(12) United States Patent
Lu

(10) Patent No.: US 8,046,606 B2
(45) Date of Patent: Oct. 25, 2011

(54) HOST COMPUTER WITH SHARED STORAGE DEVICE

(75) Inventor: Ting-Chun Lu, Nan Tou (TW)

(73) Assignees: Universal Scientific Industrial (Shanghai) Co., Ltd., Shanghai (CN); Universal Global Scientific Industrial Co., Ltd., Tsaotuen, Nantou (TW)

( * ) Notice: Subject to any disclaimer, the term of this patent is extended or adjusted under 35 U.S.C. 154(b) by 555 days.

(21) Appl. No.: 12/153,201

(22) Filed: May 15, 2008

(65) Prior Publication Data
US 2009/0287872 A1      Nov. 19, 2009

(51) Int. Cl.
*G06F 1/00* (2006.01)
*G06F 13/00* (2006.01)
(52) U.S. Cl. .................. 713/300; 713/310; 710/316
(58) Field of Classification Search .................. 713/300, 713/310, 320, 324; 710/306, 311, 315, 316
See application file for complete search history.

(56) References Cited

U.S. PATENT DOCUMENTS

| | | | |
|---|---|---|---|
| 2006/0075144 A1* | 4/2006 | Challener et al. | 709/250 |
| 2006/0206666 A1* | 9/2006 | Lambert et al. | 711/115 |
| 2006/0224801 A1* | 10/2006 | Chiu et al. | 710/70 |
| 2007/0033426 A1* | 2/2007 | Wilson et al. | 713/324 |
| 2009/0147758 A1* | 6/2009 | Kumar | 370/338 |

\* cited by examiner

*Primary Examiner* — Thomas J Cleary
(74) *Attorney, Agent, or Firm* — Bacon & Thomas, PLLC

(57) ABSTRACT

A host computer formed of a motherboard, a power supply unit with a power switch, a data storage device and an external interface is disclosed to have a transfer switch switchable between a first switch position and a second switch position, the transfer switch having three contacts in the first switch position for electrically connecting the motherboard to the power supply unit and the data storage device to the power supply unit and the motherboard to the external interface, and two contacts in the second switch position for electrically connecting the data storage device to the external interface through a data transmission interface and the data storage device to said power supply unit respectively. This design allows access to the data storage device, achieving the effect of sharing the data storage device without booting the computer system.

4 Claims, 3 Drawing Sheets

HOST COMPUTER WITH SHARED STORAGE DEVICE

BACKGROUND OF THE INVENTION

1. Field of the Invention

The present invention relates to sharing technology of computer storage device and more specifically, to a host computer with shared storage device.

2. Description of the Related Art

Conventionally, a computer system uses its internal hard disk drive to access data. Alternatively, a computer system may use an USB (universal serial bus) to store data in or fetch data from an inserted memory card, or access an external data storage device in a remote server via the Internet.

However, when wishing to access to the hard disk drive of another host computer, the computer system of this host computer must be booted, and then an external memory card or mobile memory stick must be used and linked to the USB interface of the computer system to copy the desired data to the memory card or mobile memory stick. This data accessing procedure is complicated.

Further, when wishing to access to the hard disk drive of another host computer through the Internet or a LAN (local area network), the target host computer must be booted, and a network equipment must be used and connected to the Internet or LAN. The arrangement of the necessary network wiring or wireless network equipment is also complicated.

SUMMARY OF THE INVENTION

The present invention has been accomplished under the circumstances in view. It is therefore the main object of the present invention to provide a host computer with shared storage device, which allows access to the data storage device of the computer system without booting the computer system.

It is another object of the present invention to provide a host computer with shared storage device, which is easy to operate.

To achieve these and other objects of the present invention, the host computer with shared storage device comprises a motherboard, a power supply unit with a power switch, a data storage device, and an external interface. The host computer further comprises a transfer switch switchable between a first switch position and a second switch position. The transfer switch comprises at least three contacts in the first switch position and adapted for electrically connecting the motherboard to the power supply unit and the data storage device to the power supply unit and the motherboard to the external interface, and at least one contact in the second switch position adapted for electrically connecting the data storage device to the external interface through a data transmission interface of the host computer.

Subject to the design stated above, the present invention allows access to the data storage device when the host computer is off, achieving the effect of sharing the data storage device without boosting the computer system.

DETAILED DESCRIPTION OF THE INVENTION

Figure 1:
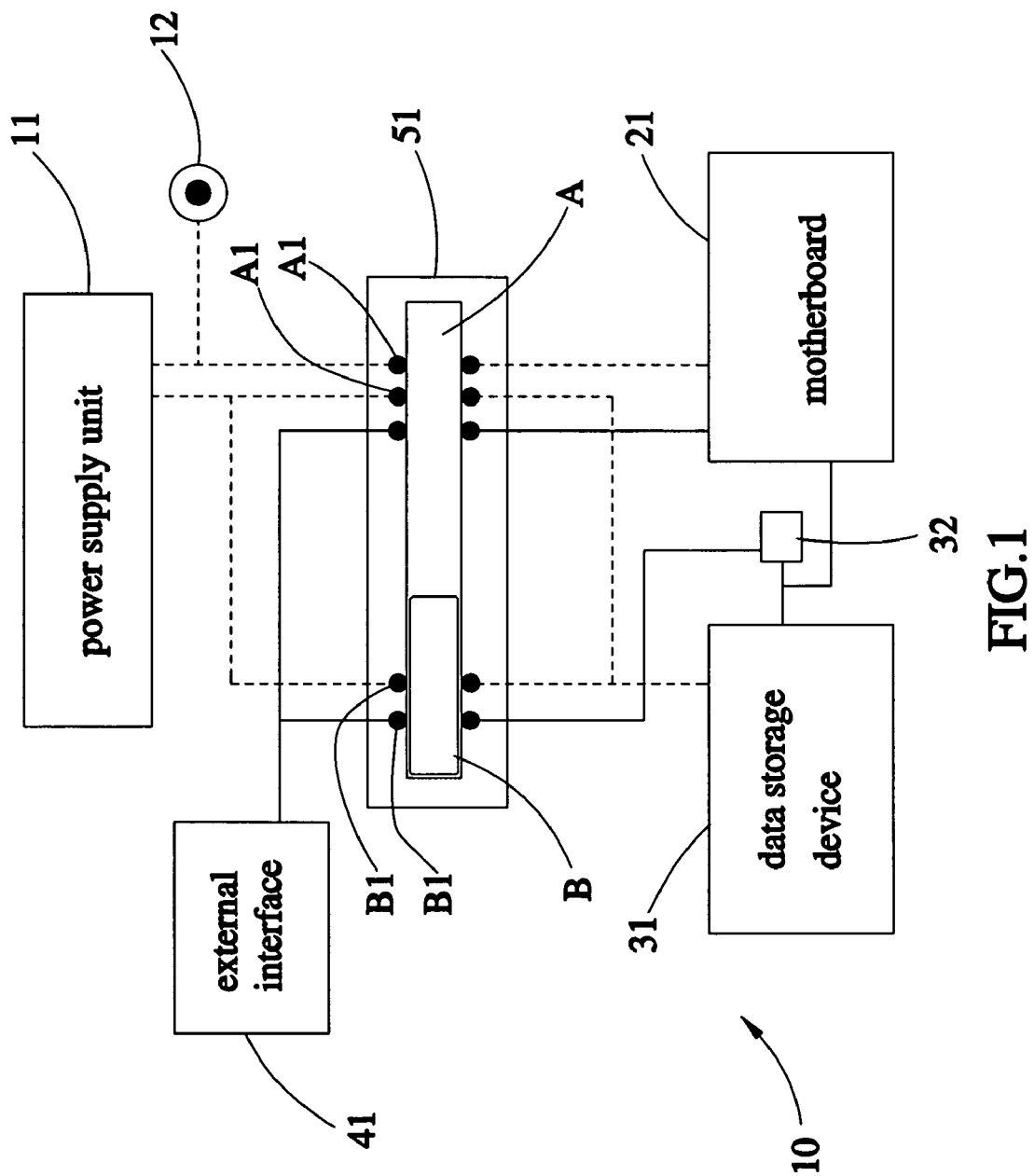
FIG. 1 is a schematic drawing showing the circuit architecture of a host computer in accordance with the present invention.

Referring to FIG. 1, a host computer 10 in accordance with the present invention is shown comprising a power supply unit 11, a motherboard 21, a data storage device 31, an external interface 41, and a transfer switch 51.

The power supply unit 11 comprises a power switch 12 adapted for enabling a user to boot the computer system.

The motherboard 21 comprises a CPU (Central Processing Unit) 20, ram modules, interface slot, and etc. Because the motherboard 21 is of the known design and not the key point of the present invention, no further detailed description in this regard is necessary. Further, the motherboard 21 is electrically connected with the power supply unit 11 through a power line.

The data storage device 31 is electrically connected with the motherboard 21. According to the present preferred embodiment, the data storage device 31 is a hard disk drive, having a data transmission interface 32, for example, IDE (Integrated Device Electronics) to USB (Universal Serial Bus) interface. Further, the data storage device 31 is electrically connected with the motherboard 21 by a power line (see the dotted line in the drawing).

The external interface 41 according to the present preferred embodiment is a USB interface. Further, the external interface 41 is electrically connected with the motherboard 21 by a data line (see the solid line in the drawing).

The transfer switch 51 is operable between a first switch position A and a second switch position B. The transfer switch 51 has three contacts A1 at the first switch position A for conducting the motherboard 21 to the power supply unit 11, the data storage device 31 to the power supply unit 11, and the motherboard 21 to the external interface 41 respectively. The transfer switch 51 has two contacts B1 at the second switch position B for the connection of the data storage device 31 to the external interface 41 through the data transmission interface 32 and the connection of the data storage device 31 to the power supply unit 11 respectively.

Figure 2:
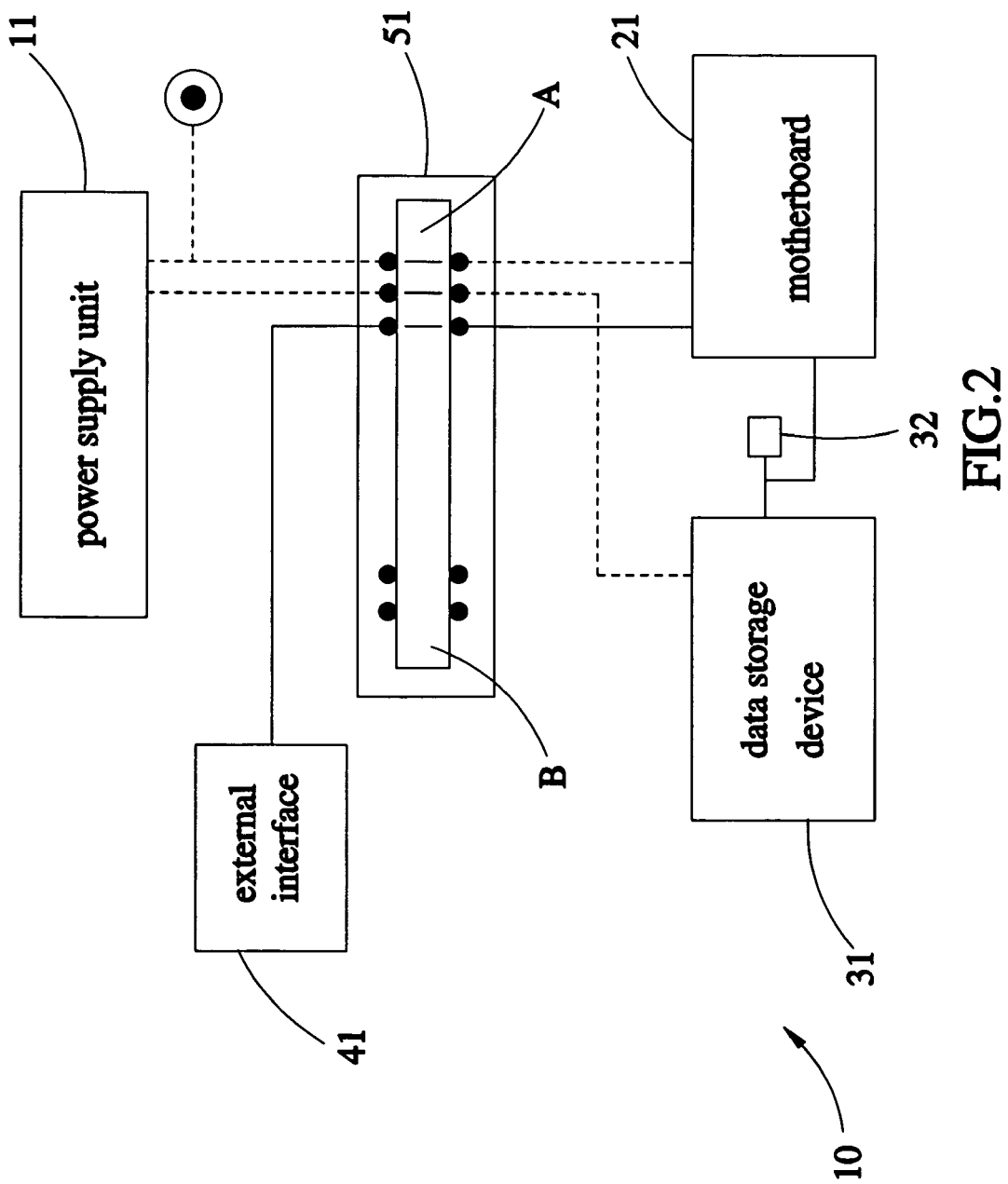
FIG. 2 corresponds to FIG. 1, showing the selection switch in the first position.

Referring to FIG. 2, when the transfer switch 51 is in the first switch position A, the three contacts A1 connect the motherboard 21 to the power supply unit 11, the data storage device 31 to the power supply unit 11, and the motherboard 21 to the external interface 41 respectively. This status is the normal operation status of a regular computer system. At this time, the motherboard 21 controls the operation of the data storage device 31.

Figure 3:
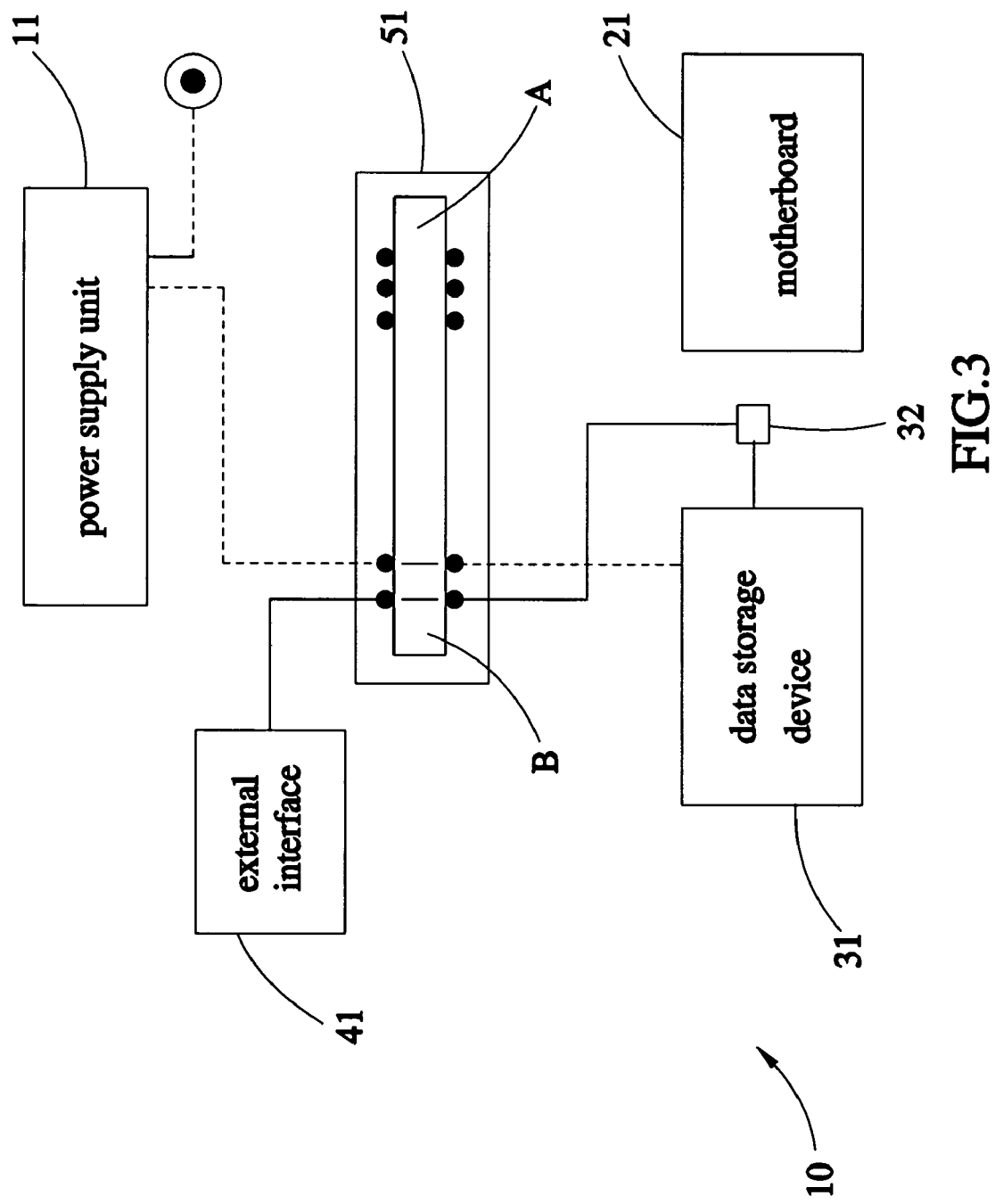
FIG. 3 corresponds to FIG. 1, showing the selection switch in the second position.

Referring to FIG. 3, when the transfer switch 51 is in the second switch position B, the data storage device 31 is electrically connected to the external interface 41 through the data transmission interface 32, and the data storage device 31 is electrically connected to the power supply unit 11. At this time, an external device can use the external interface 41 to access to the data storage device 31 through the data transmission interface 32. Under this condition, the power supply unit 11 provides the data storage device 31 with the necessary working voltage, the data of the data storage device 31 is accessible by an external device through the external interface 41 when the motherboard 21 is off.

It is to be understood that in case the external interface 41 is a USB interface, the interface itself has power supply, and therefore the data storage device 31 can obtain the power supply from the external interface 41. At this time, one contact B1 in the second switch position B of the transfer switch 51 is sufficient to connect the data storage device 31 to the external interface 41.

As stated above, the invention allows access to the data storage device 31 when the computer system is off (the motherboard 21 does no work), achieving the effect of sharing the data storage device 31 without booting the computer system.

Further, the operation of the present invention is quite simple. The transfer switch 51 is switchable when the motherboard 21 is off.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A host computer comprising a motherboard, a power supply unit, a data storage device and an external interface respectively electrically connected together, said power supply unit comprising a power switch, wherein:

the host computer further comprises a one-piece mechanical transfer switch switchable between a first switch position and a second switch position, said transfer switch comprising at least three contacts in said first switch position for respectively electrically connecting said motherboard to said power supply unit, said data storage device to said power supply unit and said motherboard to said external interface, and at least one contact in said second switch position adapted for electrically connecting said data storage device to said external interface through a data transmission interface of the host computer.

2. The host computer as claimed in claim 1, wherein said transfer switch comprises two contacts disposed in said second switch position and adapted for electrically connecting said data storage device to said external interface through said data transmission interface and said data storage device to said power supply unit respectively.

3. The host computer as claimed in claim 1, wherein said data storage device is a hard disk drive.

4. The host computer as claimed in claim 3, wherein said data transmission interface is an IDE (Integrated Device Electronics) to USB (Universal Serial Bus) interface, and said external interface is an USB (Universal Serial Bus) interface.

* * * * *